(12) United States Patent
Kim et al.

(10) Patent No.: US 9,118,044 B2
(45) Date of Patent: Aug. 25, 2015

(54) METHOD FOR MANUFACTURING MANIFOLD FOR FUEL CELL

(71) Applicants: Hyundai Motor Company, Seoul (KR); Kia Motors Corporation, Seoul (KR); Wooshin Industrial Co., Ltd., Chungcheongnam-do (KR)

(72) Inventors: Duck Whan Kim, Seoul (KR); Sae Hoon Kim, Yongin-si (KR); Young Bum Kum, Seoul (KR); Young Tae Kim, Seoul (KR); Chang Jun Lee, Hwaseong-si (KR)

(73) Assignees: HYUNDAI MOTOR COMPANY, Seoul (KR); Kia Motors Corporation, Seoul (KR); Wooshin Industrial Co., Ltd., Chungcheongnam-do (KR)

( * ) Notice: Subject to any disclaimer, the term of this patent is extended or adjusted under 35 U.S.C. 154(b) by 198 days.

(21) Appl. No.: 13/874,844

(22) Filed: May 1, 2013

(65) Prior Publication Data

US 2014/0158281 A1    Jun. 12, 2014

(30) Foreign Application Priority Data

Dec. 11, 2012    (KR) .................. 10-2012-0143263

(51) Int. Cl.

| | |
|---|---|
| *B32B 37/00* | (2006.01) |
| *H01M 8/02* | (2006.01) |
| *B29C 65/00* | (2006.01) |
| *B29C 65/06* | (2006.01) |
| *H01M 8/24* | (2006.01) |
| *B29L 31/34* | (2006.01) |

(52) U.S. Cl.

CPC ......... *H01M 8/0297* (2013.01); *B29C 65/0618* (2013.01); *B29C 66/12443* (2013.01); *B29C 66/54* (2013.01); *B29C 66/543* (2013.01); *B29C 66/8322* (2013.01); *H01M 8/2485* (2013.01); *B29L 2031/3468* (2013.01); *Y02E 60/50* (2013.01)

(58) Field of Classification Search

CPC .. B23K 20/122; B23K 20/1265; B29C 65/06; B29C 65/0609; B29C 65/0618
USPC ........ 156/73.5, 292, 308.2, 308.4, 309.6, 580
See application file for complete search history.

(56) References Cited

U.S. PATENT DOCUMENTS

| | | | | |
|---|---|---|---|---|
| 7,806,967 | B2 * | 10/2010 | Sasaoka ............................. | 96/4 |
| 2003/0155062 | A1 * | 8/2003 | Kagan et al. ................. | 156/73.5 |

FOREIGN PATENT DOCUMENTS

| | | |
|---|---|---|
| JP | 2006-252889 A | 9/2006 |
| JP | 2007-283677 A | 11/2007 |

(Continued)

*Primary Examiner* — James Sells
(74) *Attorney, Agent, or Firm* — McDermott Will & Emery LLP (57) ABSTRACT

A method for manufacturing a manifold for a fuel cell with a multilayer structure by injection-molding individual manifolds, each having welding projections and welding guides, and bonding the injection-molded individual manifolds by vibration welding includes arranging welding projections of an upper individual manifold and welding guides of a lower individual manifold to be engaged with each other while maintaining a uniform gap between each other to bond a plurality of individual manifolds in an up and down stacking structure, pressing the lower individual manifold upward, and applying vibration to the upper individual manifold in the left and right direction, thus bonding the upper and lower individual manifolds. Among the welding projections of the upper individual manifold, a non-horizontal welding projection whose longitudinal direction does not coincide with the vibration direction of the individual manifold has a variable height.

4 Claims, 10 Drawing Sheets

(56) References Cited

FOREIGN PATENT DOCUMENTS

| JP | 2008-198588 A | 8/2008 |
| JP | 2009-220341 A | 10/2009 |
| KR | 10-2011-0060357 A | 6/2011 |
| KR | 10-2011-0062257 A | 6/2011 |

* cited by examiner

< Enlarged view of A >

METHOD FOR MANUFACTURING MANIFOLD FOR FUEL CELL

CROSS-REFERENCE TO RELATED APPLICATION

This application claims the benefit of priority, under 35 U.S.C. §119(a), to Korean Patent Application No. 10-2012-0143263 filed Dec. 11, 2012, the entire contents of which are incorporated herein by reference.

BACKGROUND (a) Technical Field

The present disclosure relates to a method for manufacturing a manifold for a fuel cell. More particularly, it relates to a method for manufacturing a manifold for a fuel cell with a multilayer structure in which a plurality of individual manifolds are stacked and bonded together.

(b) Background Art

In general, a manifold for a fuel cell consists of many internal paths (or flow fields) including inlet paths and outlet paths for supplying hydrogen, air, and coolant to a fuel cell stack as an electricity generation source.

In order to integrate these internal paths, several structures having internal paths are stacked and bonded together.

Figure 1:
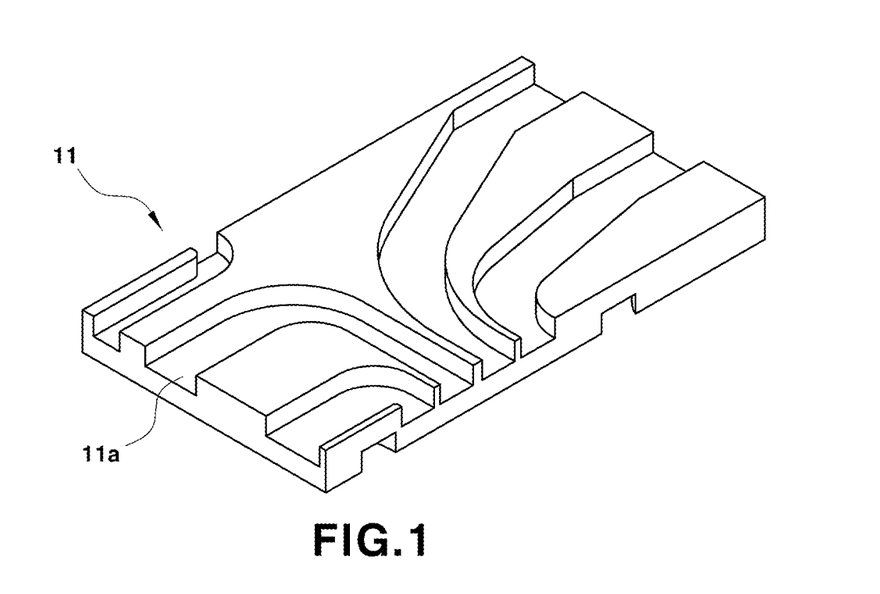
FIG. 1 is a schematic diagram showing a conventional individual manifold for a fuel cell.
Figure 2:
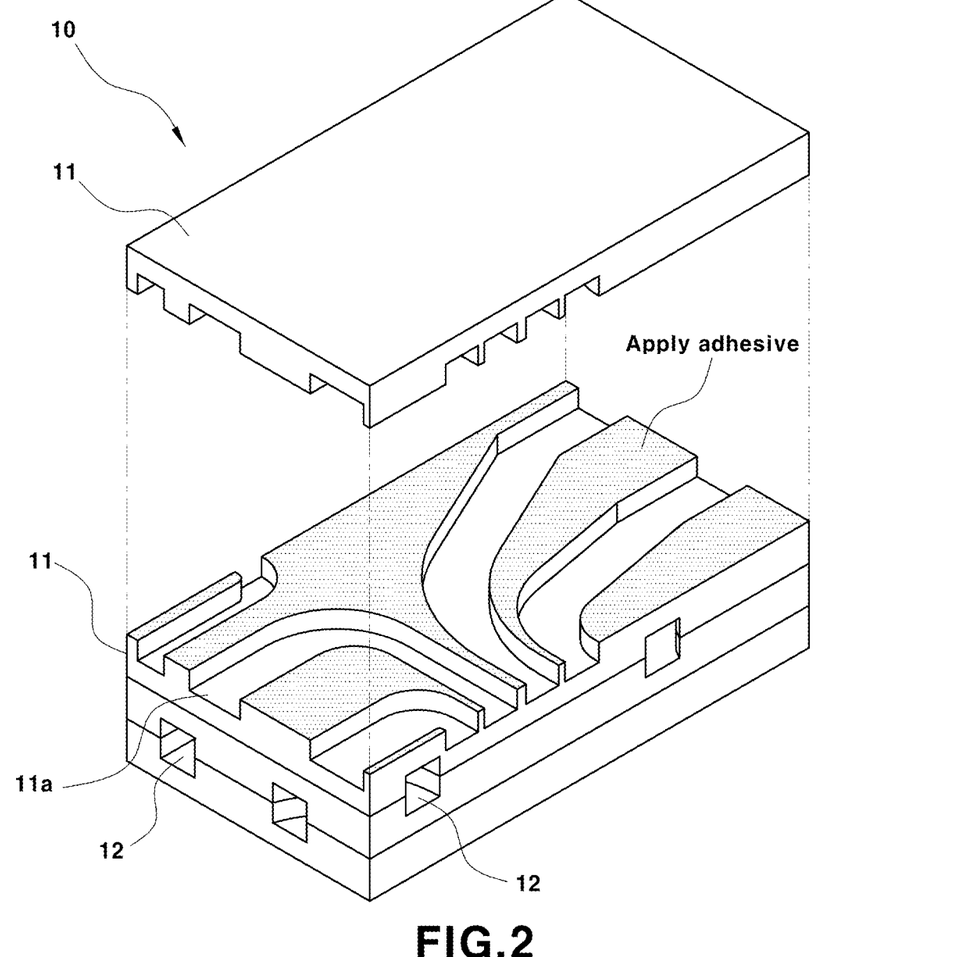
FIG. 2 is a schematic diagram showing a conventional manifold for a fuel cell.

FIG. 1 is a schematic diagram showing a conventional individual manifold for a fuel cell, and FIG. 2 is a schematic diagram showing a conventional manifold for a fuel cell.

Conventionally, in order to form a manifold 10 for a fuel cell into a multilayer structure, a plurality of individual manifolds 11 each having individual paths 11a on upper and lower surfaces are prepared as shown in FIG. 1. An adhesive is applied to path-processed surfaces (i.e., the upper and lower surfaces on which the individual paths 11a are formed) of each of the individual manifolds 11. The individual manifolds 11 are compression-bonded together, and when the adhesive is cured, the adhesive exposed to the outside of the manifold 10 is removed, thus forming the manifold 10 shown in FIG. 2.

However, the above-described method for manufacturing the manifold for the fuel cell has a number of problems.

First, due to the difference in properties between the materials for the manifold and the adhesive, a difference in volume change between the different materials occurs under environmental conditions of an actual vehicle, which degrades the adhesive. As a result, the integrity of the airtight seal of the bonded portions is broken upon long-term operation, resulting in deterioration of the durability of the manifold. As such, foreign materials may enter the internal paths 12 of the manifold as shown in FIG. 2.

For example, foreign materials may include ionic impurities which move along the flow path of coolant, and may increase electrical conductivity to cause an insulation problem. These impurities may also clog the internal paths 12 to cause a degradation in performance.

Second, although the adhesive distributed on the outer surface of the manifold is removed and subject to ultrasonic cleaning after the compression bonding, some adhesive material in the bond may be dislodged or separated during use of the fuel cell and gradually cause build up in the internal paths 12 over time.

Third, the conventional manifold for the fuel cell is formed of epoxy glass and is manufactured under processing conditions where high-speed rotation and low-speed movement are inevitable due to the nature of the material. Moreover, it may take 20 days or longer to manufacture a single manifold due to the complex and variable shape of the manifold, as well as the above-described processing conditions.

Accordingly, since the internal paths of a conventional manifold for the fuel cell require a long time to process, an additional process for reducing the weight of the fuel cell would be cost prohibitive. Moreover, even if the manufacturing time was not an issue, it would still be difficult to reduce the weight due to the high brittleness of the fuel cell manifold material.

Fourth, due to the nature of the epoxy glass material, manufacturing a fuel cell manifold by a wet process is problematic due to moisture absorption. Thus, the manifold is manufactured by a dry process, which generates a large amount of fine powder, which can create harmful environments that threaten workers' health.

The above information disclosed in this Background section may be used for enhancement of understanding of the background of the disclosure.

SUMMARY OF THE DISCLOSURE

The present disclosure provides a method for manufacturing a manifold for a fuel cell with a multilayer structure by injection-molding individual manifolds each having welding projections and welding guides and bonding the injection-molded individual manifolds by vibration welding.

According to one aspect of the present disclosure, a method for manufacturing a manifold for a fuel cell includes: arranging welding projections of an upper individual manifold and welding guides of a lower individual manifold to be engaged with each other while maintaining a uniform gap between each other to bond a plurality of individual manifolds in an up and down stacking structure, pressing the lower individual manifold upward, and applying vibration to the upper individual manifold in the left and right direction, thus bonding the upper and lower individual manifolds, wherein among the welding projections of the upper individual manifold, a non-horizontal welding projection whose longitudinal direction does not coincide with the vibration direction of the individual manifold has a variable height.

In an exemplary embodiment, when an angle between the vibration direction of the individual manifold and the longitudinal direction of the non-horizontal welding projection gradually decreases, the height of the non-horizontal welding projection may gradually decrease from one end having the largest angle to the other end having the smallest angle.

In another exemplary embodiment, among the welding projections of the upper individual manifold, a horizontal welding projection whose longitudinal direction coincides with the vibration direction of the individual manifold may have a constant height without variation.

In still another exemplary embodiment, among the non-horizontal welding projections, the welding projection that forms a constant angle with respect to the vibration direction of the upper individual manifold over the entire region of the longitudinal direction may have a constant height without variation.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Reference numerals set forth in the Drawings includes reference to the following elements as further discussed below:

| | |
|---|---|
| 100: manifold | 110: individual manifold |
| 111: individual path | 112: protruding portion |
| 113: welding projection | 113a: horizontal welding projection |
| 113b: non-horizontal welding projection bent in the form of a curve | |
| 113c: non-horizontal welding projection perpendicular to vibration direction | |
| 114: welding guide | 115: upper individual manifold |
| 116: lower individual manifold | |

It should be understood that the appended drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure provides a method for manufacturing a manifold for a fuel cell, in which individual manifolds that constitute the manifold are injection-molded and bonded into a multilayer structure by vibration welding. In particular, a variable height is applied to a welding projection formed on the individual manifold during the injection molding such that the upper and lower individual manifolds are airtightly welded together regardless of extension paths or longitudinal direction of the welding projection, thus ensuring welding strength and improving durability.

Figure 3:
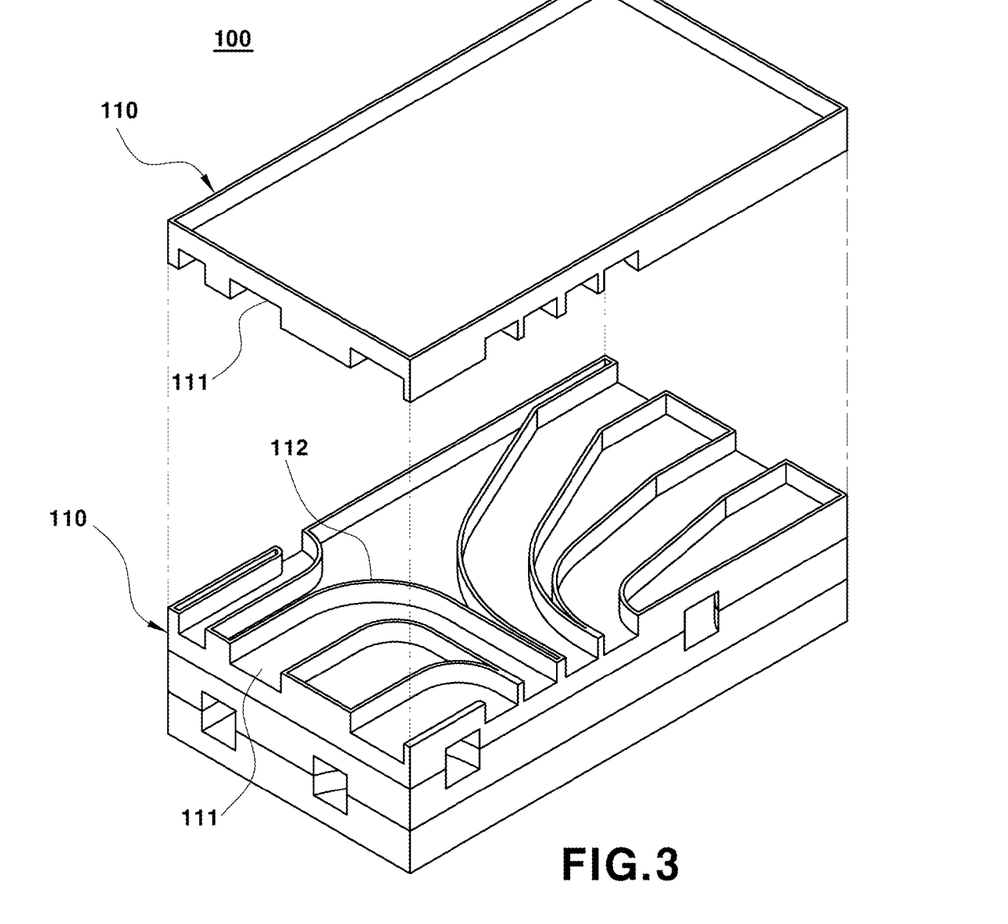
FIG. 3 is a schematic diagram showing a manifold for a fuel cell manufactured according to one embodiment of the present disclosure.
Figure 4:
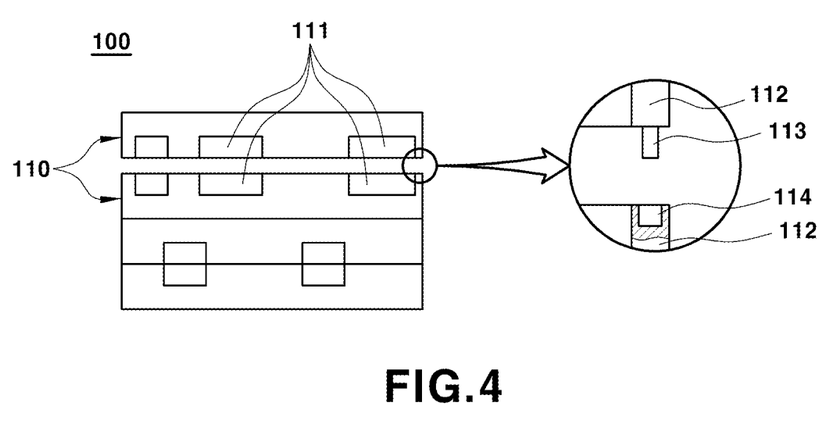
FIG. 4 is a side view showing the manifold of FIG. 3.

FIG. 3 shows a manifold for a fuel cell with a multilayer structure, in which individual manifolds are stacked in the middle thereof. FIG. 4 is a side view of the manifold of FIG. 3, in which a protruding portion of the individual manifold is partially enlarged.

As shown in FIG. 3, a manifold 100 for a fuel cell stack is manufactured by stacking and bonding a plurality of individual manifolds 110 to form a multilayer structure.

The individual manifold 110 is injection-molded using a plastic material, in which a protruding portion 112 protrudes to form a plurality of individual paths 111 on either or both of the upper and lower surfaces. As shown in FIG. 4, a welding projection 113 or a welding guide 114 is formed on the protruding portion 112.

The welding projection 113 and the welding guide 114 may be integrally molded with the protruding portion 112 during the injection molding of the individual manifold 110. That is, any one of the welding projection 113 or the welding guide 114 may be formed on at least one surface of the individual manifold 110, any one of the welding projection 113 or the welding guide 114 may be formed on both surfaces of the individual manifold 110, or each of the welding projection 113 and the welding guide 114 may be formed on both surfaces of the individual manifold 110.

As shown in FIG. 4, the welding projection 113 projects a predetermined height from the protruding portion 112 and the welding guide 114 is recessed a predetermined depth from the protruding portion 112.

Vibration welding between the two individual manifolds will be described below.

Figure 5:
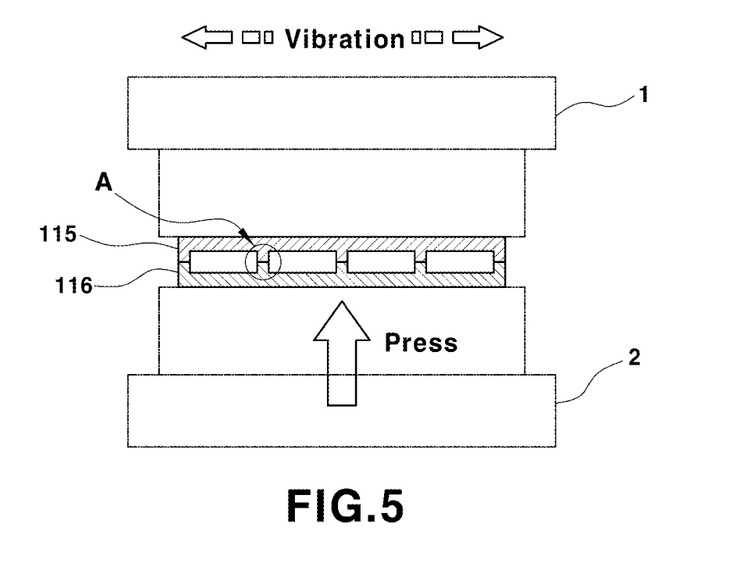
FIG. 5 is a schematic diagram showing a method for manufacturing a manifold for a fuel cell according to one embodiment of the present disclosure.
Figure 6:
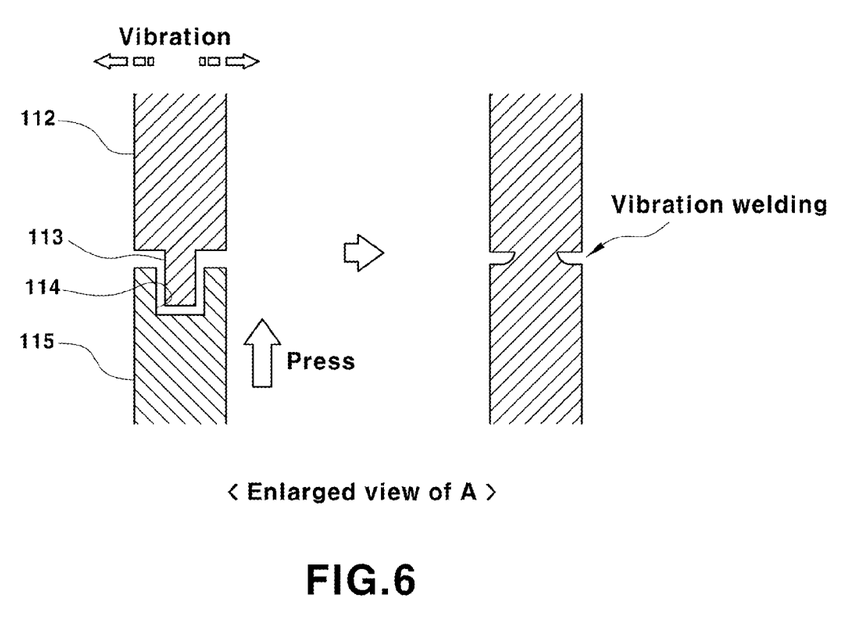
FIG. 6 is an enlarged view of portion A of FIG. 5.

FIG. 5 shows a method for manufacturing a manifold for a fuel cell according to the present disclosure, in which a process of bonding an upper individual manifold and a lower individual manifold using vibration and pressure is shown. FIG. 6 shows an enlarged portion A of FIG. 5, in which a welding projection is inserted into a welding guide at regular intervals.

The upper individual manifold and the lower individual manifold will be denoted by reference numerals 115 and 116, respectively.

As shown in FIG. 5, in the present disclosure, in order to manufacture a manifold, the upper and lower individual manifolds 115 and 116 are stacked up and down and bonded together using frictional heat generated by vibration and pressure.

Here, when the upper and lower individual manifolds 115 and 116 are arranged up and down, the welding projection 113 of the upper individual manifold 115 and the welding guide 114 of the lower individual manifold 116 are arranged at a predetermined interval from each other such that the welding projection 113 and the welding guide 114 are engaged with each other while maintaining a uniform gap between each other. Then, as shown in FIG. 5, the lower individual manifold 116 is pressed upward using a lower jig 2 to adhere to the upper individual manifold 115 and, at the same time, the upper individual manifold 115 is repeatedly reciprocated in the left and right direction, which in this embodiment is the transverse direction, by applying vibration using an upper jig 1.

As such, as the upper individual manifold 115 is reciprocated left and right and vibrates while the lower individual manifold 116 is pressed upward, frictional heat is generated therebetween. As a result, the welding projection 113 and the welding guide 114 are melted by the frictional heat, and the upper and lower individual manifolds 115 and 116 are bonded to each other.

As the lower individual manifold 116 is pressed upward, the welding guide 114 at the bottom moves to the welding projection 113 at the top to remove the gap between the welding projection 113 and the welding guide 114 and, at the same time, as the welding projection 113 is melted, the protruding portion 112 of the upper individual manifold 115 and the protruding portion 112 of the lower individual manifold 116 are welded. As a result, the upper and lower individual manifolds 115 and 116 are closely bonded and connected to each other.

Figure 7:
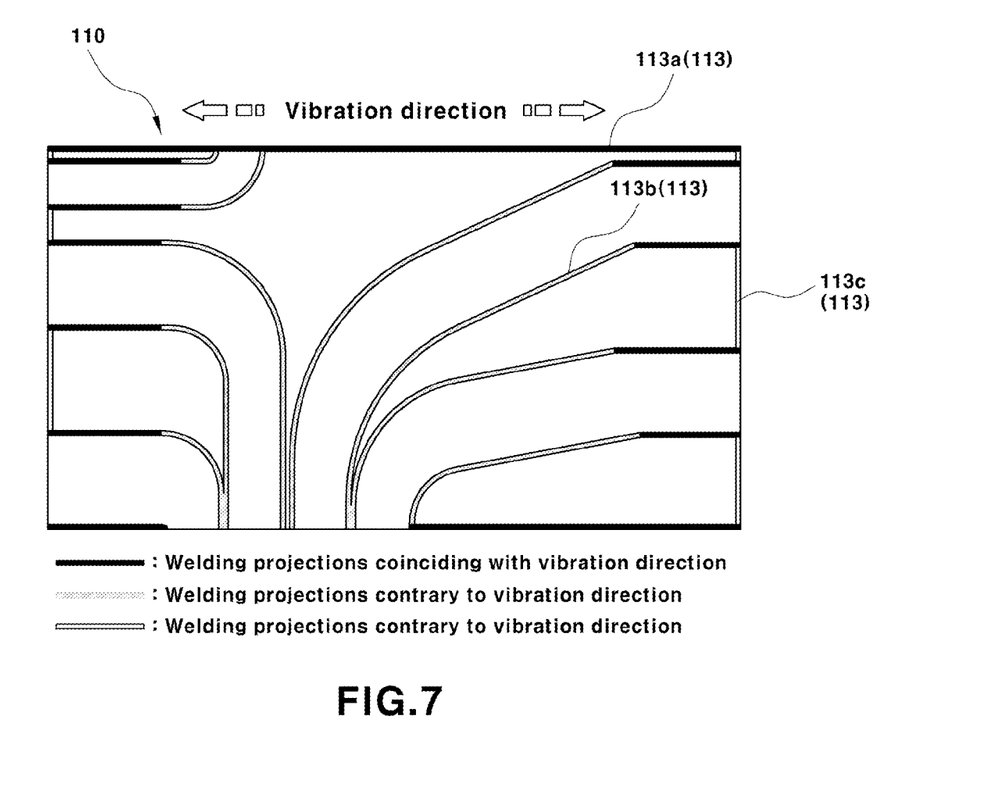
FIG. 7 is a schematic diagram showing a planar structure of an individual manifold according to one embodiment of the present disclosure.

Meanwhile, FIG. 7 shows a planar structure of an individual manifold according to the present disclosure, in which extension paths of the protruding portion are provided on one surface of the individual manifold. That is, FIG. 7 shows that protruding portions that form various individual paths are provided on one surface of the individual manifold.

As shown in FIG. 7, a plurality of protruding portions 112 are formed on the individual manifold 110 to create various routes, thus providing predetermined individual paths.

Welding projections 113 for forming the same routes as the protruding portions 112 are formed on the protruding portions 112. Welding projections 113a, 113b and 113c are formed on the protruding portions 112.

Figure 8:
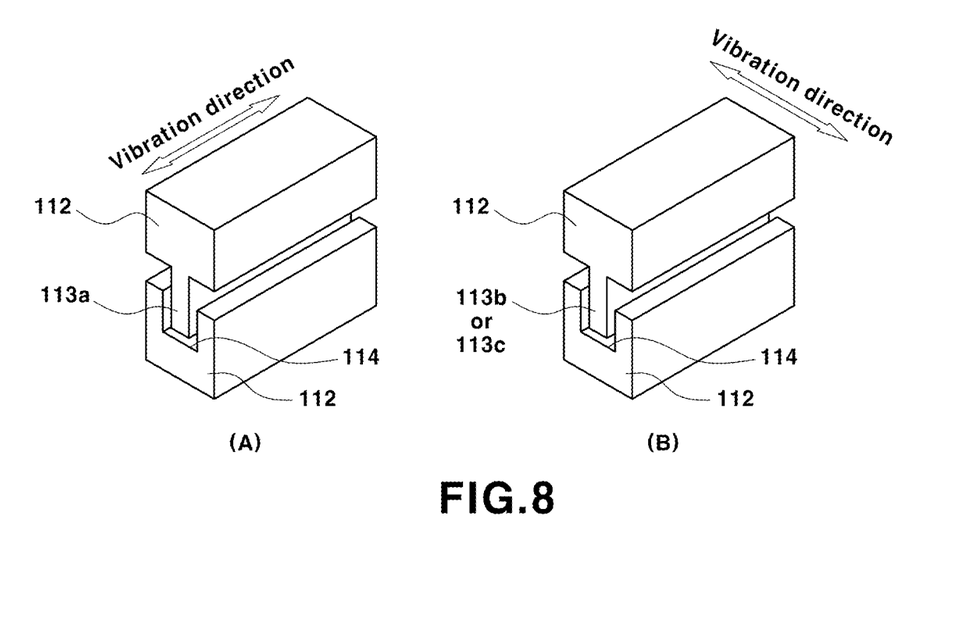
FIG. 8 is a schematic diagram showing the relationship between the vibration direction of an individual manifold and the longitudinal direction of a welding projection during vibration welding according to one embodiment of the present disclosure.

FIG. 8 schematically illustrates the relationship between the vibration direction of the individual manifold and the extension paths of the welding projections during vibration welding, the extension paths being the paths formed by the welding projections 113a, 113b and/or 113c passing over one surface of the individual manifold 110.

As shown in FIGS. 7 and 8, the welding projections 113a, 113b and 113c may be broadly divided into the welding projection 113a that coincides with the vibration direction or reciprocating direction of the individual manifold 110 during vibration welding and the welding projections 113b and 113c that are contrary to, or do not coincide with, the vibration direction of the individual manifold 110.

Here, the welding projection that coincides with the vibration direction of the individual manifold 110 refers to a horizontal welding projection 113a of which the extension path or the longitudinal direction of the welding projection coincides with the vibration direction. The welding projections that do not coincide with, or are different from, the vibration direction of the individual manifold 110 refer to non-horizontal welding projections 113b and 113c.

The welding projection denoted by reference numeral 113a in FIG. 7 is the horizontal welding projection 113a having a route or longitudinal direction that coincides with the vibration direction of the individual manifold 110, and all the welding projections shown as the "welding projections that coincide with the vibration direction" in FIG. 7 have a route that coincides with the vibration direction of the individual manifold 110, like the horizontal welding projection 113a.

As such, the longitudinal direction of the horizontal welding projection 113a coincides with the vibration direction during the vibration welding process of the individual manifolds 110. In a process where as the lower welding guide 114 is pressed toward the upper welding projection 113, the gap between the welding projection 113 and the welding guide 114 is removed, the welding projection 113 is melted, and the upper and lower protruding portions 112 are welded. Thus, a reduction in the amount of vibration due to a mismatch between the vibration direction and the longitudinal direction of the welding projection 113a does not occur, and thus it is possible to keep the friction temperature and the melting rate required during the welding.

Accordingly, the horizontal welding projection 113a has the same height over the entire region of the longitudinal direction.

The non-horizontal welding projection 113b shown in FIG. 7 has a route or longitudinal direction that does not coincide with the vibration direction of the individual manifold 110, and all the welding projections shown as the "welding projections that are contrary to the vibration direction" in FIG. 7 have a route that does not coincide with the vibration direction of the individual manifold 110, such as the non-horizontal welding projection 113b.

As such, the longitudinal direction of the non-horizontal welding projection 113b does not coincide with the vibration direction during the vibration welding process of the individual manifolds 110, and thus a reduction in the amount of vibration, compared to the horizontal welding projection of which the longitudinal direction coincides with the vibration direction, occurs. Thus, it is difficult to maintain the friction temperature and the melting rate required during the welding.

Accordingly, the non-horizontal welding projection 113b has a variable height over the entire region in the longitudinal direction.

As shown in FIG. 7, the welding projection 113b forms a route bent in the form of a curve that is contrary to the vibration direction of the individual manifold 110. As such, a constant angle is formed with respect to the vibration direction such that the vibration direction and the amount of vibration applied to the welding projection 113b varies depending on the longitudinal direction during the vibration welding.

Accordingly, the height of the welding projection is variably applied depending on the vibration direction and the amount of vibration applied to each point or each region of the longitudinal direction of the non-horizontal welding projection 113b. As a result, the height of the non-horizontal welding projection 113b is variably formed along the longitudinal direction.

In the case of the non-horizontal welding projection 113b, the vibration is applied in an irregular direction due to the difference between the vibration direction of the individual manifold 110 and the longitudinal direction of the welding projection. Thus, the amount of vibration applied to the non-horizontal welding projection 113b is reduced compared to the horizontal welding projection 113a. As a result, the friction temperature and the melting rate of the non-horizontal welding projection 113b during the vibration welding are reduced compared to the horizontal welding projection, which is caused by the angle between the vibration direction of the individual manifold 110 and the longitudinal direction of the welding projection. Thus, the height of the non-horizontal welding projection 113b is variably applied along the longitudinal direction depending on the angle between the longitudinal direction of the welding projection 113b and the vibration direction of the individual manifold 110. As a result, the frictional heat generated between the welding projection 113b and the welding guide 114 reaches a predetermined friction temperature and an appropriate amount of molten resin is provided during the vibration welding, thereby improving the welding quality.

Accordingly, with the use of the non-horizontal welding projection 113b having a variable height, it is possible to prevent problems in quality caused when the vibration direction of the individual manifold 110 and the longitudinal direction of the welding projection 113 do not coincide with each other. For example, it is possible to prevent an incomplete bonding caused when the frictional heat between the welding projection 113 and the welding guide 114 is below a predetermined friction temperature or the melting rate of the welding projection is insufficient.

In the present disclosure, as the non-horizontal welding projection 113b having a variable height is applied to the individual manifold 110, it is possible to prevent problems in quality caused by a mismatch between the vibration direction and the longitudinal direction of the welding projection and, at the same time, ensure welding strength by airtight welding and improve durability.

Figure 9:
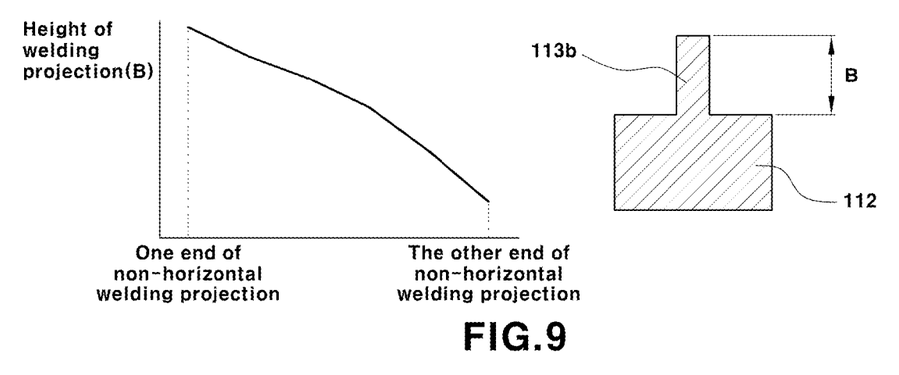
FIG. 9 is a diagram showing a variable height along the longitudinal direction from one end to the other end of a non-horizontal welding projection in an individual manifold according to one embodiment of the present disclosure.

A variable height along the longitudinal direction from one end to the other end of a non-horizontal welding projection is shown in FIG. 9.

The variable height of the non-horizontal welding projection 113b may be selected based on the amount of vibration and the vibration direction that vary depending on the angle between the vibration direction of the individual manifold and the longitudinal direction of the non-horizontal welding projection occurring at each point of the longitudinal direction of the welding projection with respect to the vibration direction of the individual manifold 110.

For example, when the angle between the vibration direction of the individual manifold 110 and the longitudinal direction of the non-horizontal welding projection 113b gradually decreases along the longitudinal direction of the non-horizontal welding projection 113b, the height of the non-horizontal welding projection 113b may decrease from one end to the other end as shown in FIG. 9.

The non-horizontal welding projection 113b may have an angle difference in the longitudinal direction thereof with respect to the vibration direction of the individual manifold 110 and, in this embodiment, the height of the non-horizontal welding projection 113b may gradually decrease from the one end having the largest angle difference to the other end having the smallest angle difference in the region where the angle between the vibration direction of the individual manifold 110 and the longitudinal direction of the non-horizontal welding projection 113b gradually decreases.

The welding projection 113c in FIG. 7 is included in the "welding projections that are contrary to the vibration direction", and this non-horizontal welding projection 113c that is perpendicular to the vibration direction has an angle of approximately 90° with respect to the vibration direction but is perpendicular to the vibration direction over the entire region in the longitudinal direction. Accordingly, the amount of vibration and the vibration direction are applied in the same manner over the entire region of the welding projection 113c, and thus the welding projection 113c may have the same height over the entire region in the longitudinal direction of the welding projection 113c.

However, in the case of the non-horizontal welding projection 113c that is perpendicular to the vibration direction, when the same vibration as the horizontal welding projection 113a is applied, a minimum amount of vibration is applied with respect to the horizontal welding projection 113a, and thus the non-horizontal welding projection 113c has a relatively large height among the welding projections 113 of the individual manifold 110.

That is, the horizontal welding projection 113a has a relatively small height among the welding projections 113 of the individual manifold 110, and the non-horizontal welding projection 113c that is perpendicular to the vibration direction in the entire region has the maximum height.

Figure 10:
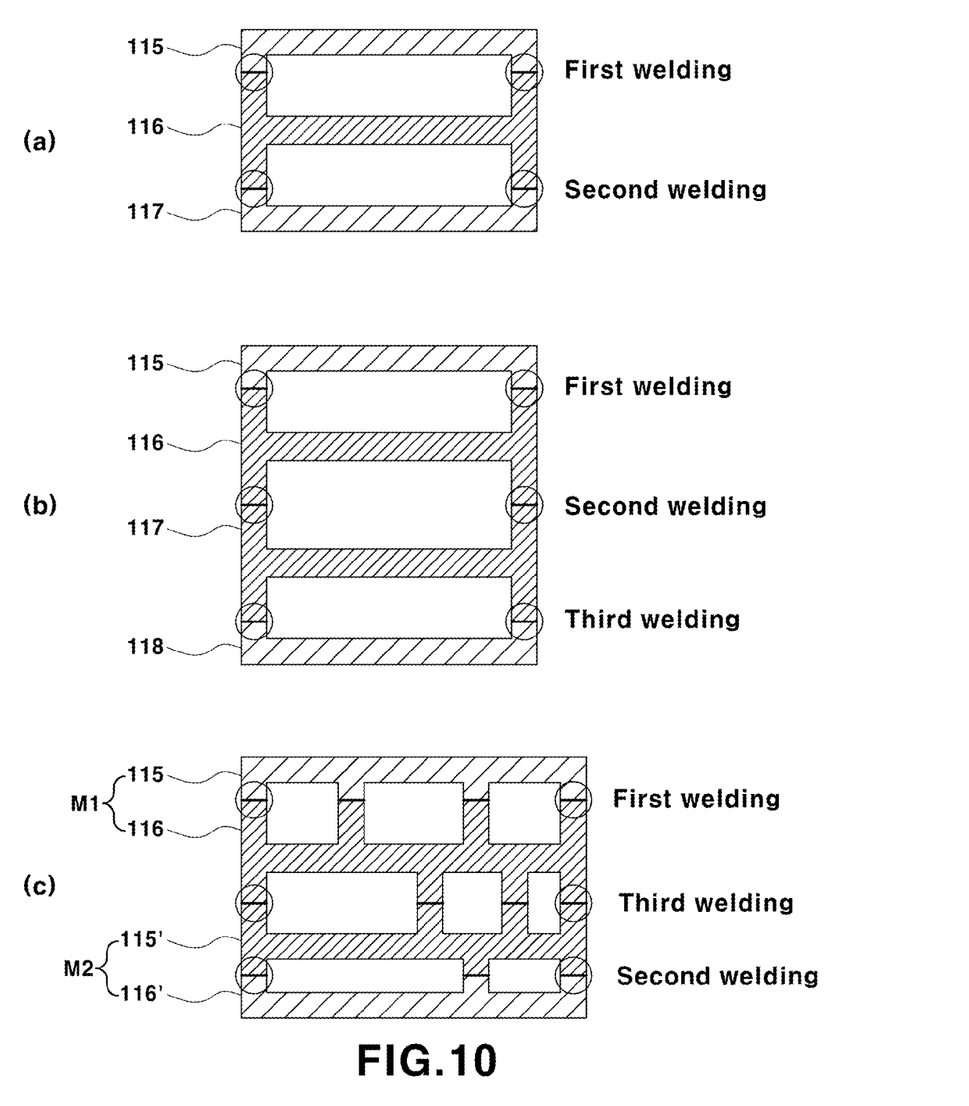
FIG. 10 is a schematic diagram showing cross-sectional structures of manifolds bonded by welding according to one embodiment of the present disclosure.

Meanwhile, FIG. 10 is a schematic diagram showing cross-sectional structures of manifolds bonded by welding two individual manifolds and then stacking another individual manifold.

In the present disclosure, the individual manifolds 110 constituting each of the layers of the manifold may have any one or both of the welding projection 113 and the welding guide 114 on both surfaces. Accordingly, upper and lower individual manifolds 115 and 116 may be bonded and connected to each other by vibration welding in the above-described manner, and a first individual manifold 117 may be bonded to the bottom of the lower individual manifold 116 by vibration welding to manufacture a manifold with a 3-layer structure as shown in (a) of FIG. 10. Otherwise, as shown in (b) of FIG. 10, a second individual manifold 118 may be bonded to the bottom of the first individual manifold 117 by vibration welding to manufacture a manifold with a 4-layer structure. Thus, it is possible to manufacture a manifold with a multilayer structure by vibration welding in the above manner.

Moreover, as shown in (c) of FIG. 10, it is possible to manufacture a manifold with a 4-layer structure by bonding two individual manifolds by first and second vibration weldings and then bonding two multilayer manifolds M1 and M2 including two bonded individual manifolds by third vibration welding.

In the above-described manner, it is possible to easily manufacture a manifold with a multilayer structure by stacking and bonding a plurality of individual manifolds and multilayer manifolds by repeated vibration welding.

As such, in the present disclosure, it is possible to additionally stack an individual manifold or a separate multilayer manifold on a multilayer manifold and then bond them by vibration welding, thus increasing the degree of freedom in design.

Moreover, in the present disclosure, since each of the individual manifolds that constitute the manifold is injection-molded using a plastic material instead of epoxy glass and, at the same time, the welding projection, the welding guide, and the individual path for the vibration welding are formed, it is possible to reduce the manufacturing time of the manifold and increase the productivity. Furthermore, since the manifold is manufactured with a bonding structure through the vibration welding without the use of an adhesive, it is possible to prevent the durability from being deteriorated by the difference in volume change due to the temperature change, ensure adhesion, durability and airtightness, and prevent foreign materials from entering the individual paths, thus improving the performance of the fuel cell.

As described above, the method for manufacturing the manifold for the fuel cell according to the present disclosure has the following advantages.

1. Since the individual manifolds are bonded by vibration welding without the use of an adhesive, the change in volume according to the change in temperature is constant due to the properties of the same material, which improves the durability and does not cause the generation of foreign materials during operation over time.

2. Since the non-horizontal welding projections having a variable height are applied to the individual manifold, it is possible to prevent the quality problem caused by a mismatch between the vibration direction of the individual manifold and the longitudinal direction of the welding projections and, at the same time, ensure welding strength by airtight welding and improve the durability.

3. Since the individual paths are formed at the same time during the injection molding of the individual manifold, it is possible to significantly reduce the manufacturing time, thus lowering the time for mass production.

4. Since the conventional manual machining and adhesion processes for processing the paths are eliminated, it is possible to reduce the manufacturing cost and prevent the generation of fine powder to improve the safety of the working environment.

5. It is possible to maintain a minimum thickness of the manifold and reduce the weight, and thus it is possible to improve the performance of the fuel cell.

6. It is possible to additionally stack an individual manifold or a separate multilayer manifold on a multilayer manifold and then bond them by vibration welding, thus increasing the degree of freedom in design.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of manufacturing a manifold for a fuel cell, the method comprising:
   arranging welding projections of a first individual manifold and welding guides of a second individual manifold to be engaged with each other while maintaining a uniform gap between each other to bond the first and second individual manifolds in an up and down stacking structure;
   pressing one of the first and second individual manifolds; and
   applying vibration to the other of the first and second individual manifolds in a left and right vibration direction to bond the first and second individual manifolds,
   wherein among the welding projections of the first individual manifold, a non-horizontal welding projection whose longitudinal direction does not coincide with the vibration direction has a variable height according to an angle between the longitudinal direction of the non-horizontal welding projection and the vibration direction.

2. The method of claim 1, wherein when the angle between the longitudinal direction of the non-horizontal welding projection and the vibration direction gradually decreases, the height of the non-horizontal welding projection gradually decreases from one end having the largest angle to the other end having the smallest angle.

3. The method of claim 1, wherein among the welding projections of the first individual manifold, a horizontal welding projection having a longitudinal direction which coincides with the vibration direction has a constant height without variation.

4. The method of claim 1, wherein the non-horizontal welding projection forms a constant angle with respect to the vibration direction over the entire region of the longitudinal direction has a constant height without variation.

* * * * *